(No Model.)
J. W. KYNAST.
ATTACHMENT FOR COLLAR BUTTONS.
No. 580,112. Patented Apr. 6, 1897.
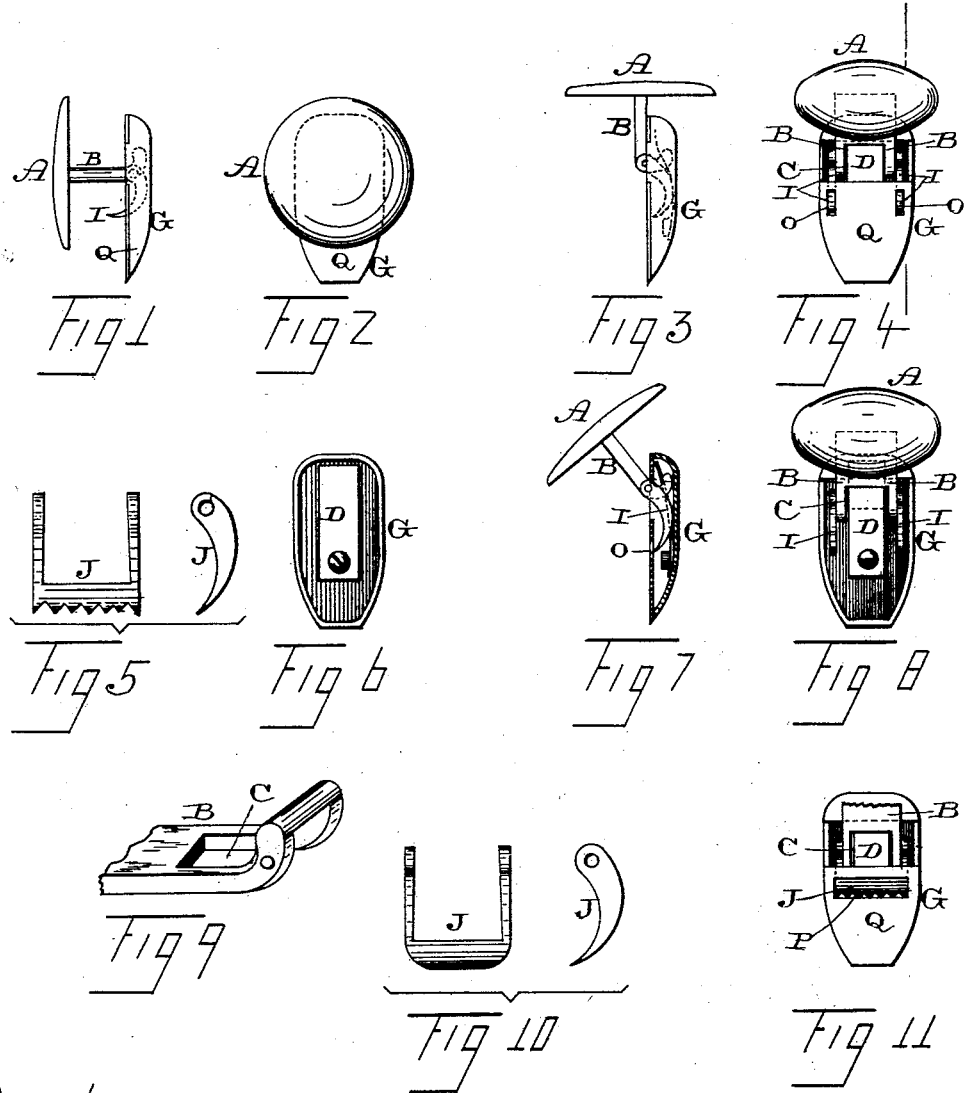
WITNESSES
Geo. H. Snyder
Chas. W. Parker
INVENTOR
JOHANN WILHELM KYNAST
by Oscar A. Michel & Co.
attys

UNITED STATES PATENT OFFICE.

JOHANN WILHELM KYNAST, OF BROOKLYN, NEW YORK.

ATTACHMENT FOR COLLAR-BUTTONS.

SPECIFICATION forming part of Letters Patent No. 580,112, dated April 6, 1897.

Application filed June 25, 1896. Serial No. 596,890. (No model.)

*To all whom it may concern:*

Be it known that I, JOHANN WILHELM KYNAST, a citizen of the United States, residing at Brooklyn, in the county of Kings and State of New York, have invented certain new and useful Improvements in Attachments for Collar-Buttons; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in collar-buttons; and it consists in a button having a shank rigidly secured thereto, and which shank has a curved and slotted inner end, combined with the pivoted portion of the button, a flat spring secured thereto, and a hook or hooks pivoted upon the shank and which serve to catch in the necktie, as will be more fully described hereinafter.

The objects of my invention are to secure the movable portion of the button to the end of the shank by means of a spring and to operate the hooks by pivoting them to the curved end of the shank, so that the movement of the movable portion of the button will cause the ends of the hooks to protrude or be retracted within the movable part of the button.

Figure 1 is a side elevation of a button which embodies my invention complete. Fig. 2 is an end view. Fig. 3 is a side elevation showing the two parts of the button turned at an angle to each other. Fig. 4 is a side view taken at right angles to Fig. 3. Fig. 5 shows one form of a catch or hook in two positions. Fig. 6 is a plan view of the movable portion of the button, showing the spring. Fig. 7 is a part-sectional view of the button complete. Fig. 8 is a similar view to Fig. 4, with the covering-plate removed from the movable portion of the button. Fig. 9 is a detached perspective of the curved and slotted end of the shank. Fig. 10 is similar view to Fig. 5, showing another form of catch or hook. Fig. 11 is a detail view showing a slot in the covering-plate of the movable portion of the button.

A represents that portion of the button which is on the inner side of the neckband next to the neck, and which has the shank B secured rigidly thereto. As shown in Fig. 9, the outer end of this shank B is curved upwardly and provided with a perforation C sufficiently large to allow the spring D, rigidly secured to one end to the movable portion G of the button, to pass freely through it, as shown in Figs. 7, 8, and 11. This spring is flat and serves to retain the movable portion G of the button in any desired position and is the only means of fastening for connecting this portion G to the shank.

Pivoted to the curved end of the shank in any suitable manner are the hooks or catches I or the plate J, having a smooth or serrated edge, as may be preferred, as shown in Figs. 5 and 10. Either hooks or catches may be used, as preferred, to catch in the necktie and keep it from rising over the collar, but hooks are preferable. If hooks are used, two small slots O will be made in the covering-plate Q of the movable portion G of the button, but if catches are used a single slot P is made. These hooks or catches being pivoted on the curved end of the shank are operated entirely by the turning movement of the portion G. As shown in Figs. 3 and 7, if the two portions A G are turned at an angle to each other the protruding ends of the hooks or catches are withdrawn, but as soon as these two portions are turned into line with each other the points are made to project. In moving either the shank or the movable portion of the button these hooks or catches are moved endwise, and being curved and resting against the bottom of the portion G their free ends are moved back and forth through the slot in the covering-plate.

Having thus described my invention, I claim—

1. In a collar-button, the portion A, having the shank B, secured thereto, combined with the portion G, and the spring D, secured to the portion G, the inner end of the shank having an opening through it for the free end of the spring to pass through and connect the shank to the portion G, and having its inner end curved where it bears against the portion G, so as to act as a cam, substantially as shown.

2. In a collar-button, the two portions A, G, and the shank having a curved end, combined with a hook or catch pivoted to this curved end of the shank and extending in the opposite direction, whereby when the shank is inclined the point of the hook is withdrawn inside of the part G and when the shank is raised the point of the hook is made to project, substantially as described.

3. In a collar-button, the two portions A, G, and the shank having a curved perforated end, combined with a spring secured to the portion G and extending through the said perforated end; and the hooks or catch pivoted to the curved end of the shank, substantially as set forth.

In testimony that I claim the invention set forth above I have hereunto set my hand this 29th day of May, 1896.

JOHANN WILHELM KYNAST.

Witnesses:
OSCAR A. MICHEL,
GREGOR WALZEL.